Sept. 8, 1964    B. J. MILLEVILLE    3,147,950
HIGH PRESSURE BAR STOCK VALVE
Filed Sept. 18, 1961
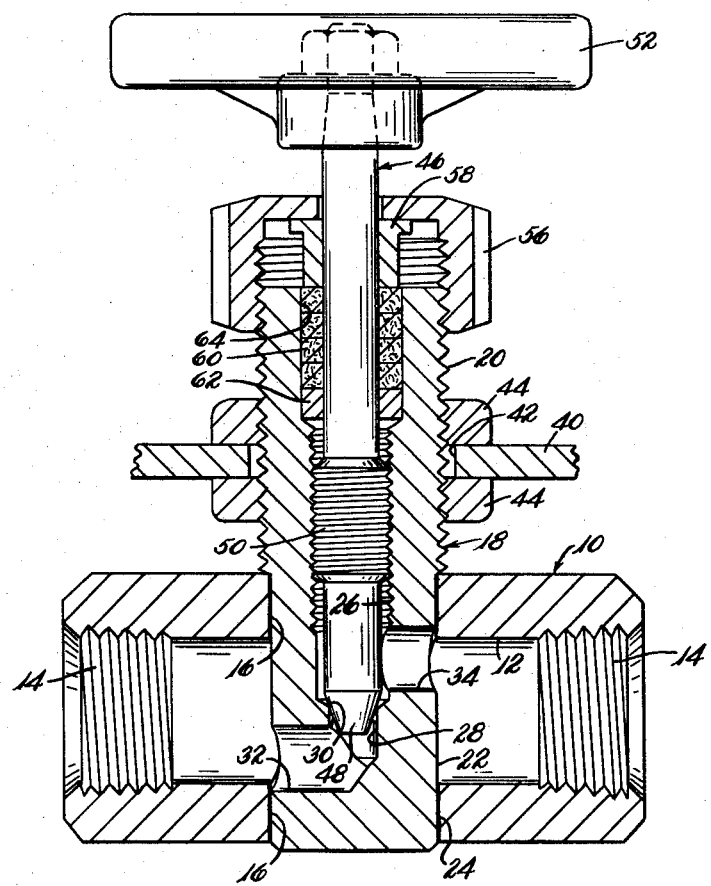
INVENTOR.
BERTRAM J. MILLEVILLE
BY Oldham & Oldham
ATTYS.

United States Patent Office 3,147,950
Patented Sept. 8, 1964

3,147,950
HIGH PRESSURE BAR STOCK VALVE
Bertram J. Milleville, Wadsworth, Ohio, assignor to The Ohio Injector Company, Wadsworth, Ohio, a corporation of Ohio
Filed Sept. 18, 1961, Ser. No. 138,642
1 Claim. (Cl. 251—214)

This invention relates to globe type valves, and, more particularly, is concerned with high pressure valves of this type made from bar stock.

It is the general object of the invention to provide a relatively simple, inexpensive, maintenance-free and long-lived globe type valve of relatively small size, and adapted to handle high pressures, the valve being characterized by being made from bar stock.

In typical commercially available valves of this type, the valve seat is an integral part of the body, and when the body is made of material not particularly hard or corrosion resistant, such as carbon steel, the seat has the usual susceptibility to deterioration by physical damage and/or corrosion characteristic of that material. Another object of the invention is to provide, in a bar stock valve of simple configuration, a seat of hard, corrosive-resistant alloy material.

In order to provide the improved durability of a relatively hard, corrosion resistant seat in valves of the type having the seat integral with the body, it is a general practice to offer an alternate construction in which the entire body is made of a corrosion resistant material, such as stainless steel. Some more commonly used grades of stainless steel, particularly those containing 11½ to 13% chromium as the principal alloying element, are air hardening and subject to local loss of ductility and possible cracking when welded.

Another object of the invention is to provide a hard corrosion-resistive seat in a globe type valve with a readily weldable carbon steel body whereby the back welding of pipe to the body is facilitated.

Another object of the invention is to provide a body-bonnet connection in which the bonnet is not subjected to outwardly directed fluid pressure forces, and in which, therefore, there is no possibility whatever of a missile-type separation of the bonnet from the body.

Many valves of this type utilize a square bar for the body, in order to present a suitable threaded or bored recess of uniform depth for attachment of the bonnet thereto.

Another object of the invention is to provide a valve of the character described in which round bar stock is employed for both the body and the bonnet to provide not only simplicity of construction but a maximum of strength with a minimum of size and weight.

In valves with threaded fastening between body and bonnet, it is common practice to provide a band of hexagonal section to facilitate wrench tightening of the bonnet into or onto the body. This complicates the problem of providing for panel mounting of such valves, since this band occupies space which could otherwise be used for panel nut threads. The usual solution is to provide a special design, at extra cost, involving the use of lengthened bonnets and stems, where panel mounting is desired. Another object of the invention is to provide a valve of the type described in which provision for panel mounting can be made without the necessity for special extra long bonnets and stems.

Another object of the invention is to provide a valve construction in which the torque applied to the hand wheel in the operation of the valve cannot under any circumstances cause the bonnet to be unscrewed from the body.

The foregoing objects of the invention, and other objects which will become apparent as the description proceeds, are achieved by the combination in a globe type valve of a round bar stock body of carbon steel having a passage therethrough which is internally threaded at its ends, said body also having a round transverse bore therethrough whose axis intersects the axis of the first bore, and having a diameter slightly greater than the width of said passage, a round bar stock bonnet of corrosion-resistant material having an externally threaded upper portion and a reduced diameter lower portion, the lower portion extending snugly into the transverse bore in the body to substantially fully close the same, means brazing the bonnet to the body in sealed relation, said bonnet having a round axial bore from the top down to a point slightly below the longitudinal axis of the body, a valve seat formed adjacent the lower end of the axial bore in the bonnet, the bonnet being formed with one passage connecting the underside of the valve seat with the axial bore of the body to one side of the bonnet, and with a second passage connecting the upper side of the valve seat with the axial bore of the body to the other side of the bonnet, a corrosion-resistant stem extending into the bore of the bonnet and having a tapered lower end adapted to engage in sealing relation with the valve seat, a handwheel secured to the upper end of the stem, a portion of the bore of the bonnet and a portion of the stem being cooperatively threaded, an internally threaded packing nut threaded on the upper end of the bonnet, and packing means between the stem and the bonnet compressed by the packing nut.

For a better understanding of the invention reference should be had to the accompanying drawing wherein the single figure is a longitudinal vertical cross-sectional view through a globe type valve incorporating the principles of the invention.

Having more particular reference to the drawing, the numeral 10 indicates generally a valve body made from round bar stock and formed with a round axially concentric bore 12 from end to end of the body. The diameter of the bore 12 is about ½ the diameter of the body 10. The ends of the bore 12 are internally threaded, as at 14, for the threaded ends of pipes not shown, adapted to connect to the valve body.

In one preferred embodiment of the invention the body 10 is made from carbon steel so that the pipes connected to the body can be back welded, to prevent leakage, in an easier and more conventional manner than would be the case if the body 10 were made from corrosion-resistant metal, such as stainless steel.

The body 10 is formed with a transverse bore 16 which extends completely through the body 10, and with the axis of the bore 16 normally bisecting the axis of the bore 12 of the body, and at right angles thereto. The diameter of the bore 16 is slightly greater than the diameter of the bore 12 so that when the bonnet, indicated as a whole by the numeral 18, is inserted into the bore 16 the bonnet completely closes the bore 12.

The bonnet 18 comprises an externally threaded upper portion 20, and an unthreaded lower portion 22, the lower portion 22 usually being of somewhat smaller diameter than the diameter of the upper portion 20, in the manner shown in the drawing. The lower portion 22 of the bonnet 18 is snugly received in the transverse bore 16 in the body 10 and extends through the body 10, as shown in the drawings. The lower portion 22 of the bonnet 18 is securely brazed to and sealed in relation with the body 10 in all areas of contact between the body and bonnet, such brazing being indicated, in part, by the numeral 24.

The bonnet 18 is formed with a bore 26 of approximately ⅓ the diameter of the bonnet 18 which extends from the top of the bonnet and down into but not through the lower portion 22 of the bonnet, the bore 26 terminating in a reduced diameter counterbore 28 providing a valve seat 30 in the lower portion 22 of the bonnet. A lateral passage 32 of a diameter about equal to the bore 26 through the lower end of the bonnet 22 connects the underside of the valve seat 30 with the bore 12 lying to one side of the bonnet, and a lateral passage 34 of about the diameter of the bore 26 connects the upper side of the valve seat 30 with the other end of the bore 12 in the valve body 10.

The externally threaded upper portion 20 of the bonnet 18 allows the valve, if desired, to be mounted upon a panel 40 having a hole 42 receiving the upper portion 20 of the bonnet, and with nuts 44 threaded upon the upper portion of the bonnet engaging with opposite sides of the panel 40. Thus, a very compact panel mounting of the valve can be achieved if desired.

Received in the bonnet 18 is a stem, indicated as a whole by the numeral 46, and having a tapered lower end 48 adapted to engage in sealing relation with the valve seat 30 when the stem 46 is lowered. A middle portion of the bore 26 in the bonnet 18 is internally threaded, and an enlarged diameter portion 50 of the stem is externally threaded to cooperatively engage with the internal threads on the bonnet whereby the stem 46 can be moved to and from the valve seat 30 upon the rotation of a hand wheel 52 secured to the upper end of the stem 46.

The bonnet 18 is preferably and conveniently made from round bar stock of corrosion-resistant material such as stainless steel whereby the internal threads 3 and valve seat 30 possess high corrosion resistance.

An internally threaded gland nut 56, rotatable with respect to the stem 46, screws upon the threaded upper portion 20 of the bonnet 18 and presses a packing gland 58 down against packing 60 in turn engaging a junk ring 62 received in an enlarged counterbore 64 at the upper end of the bonnet 18. Tightening the gland nut 56 onto the upper end of the bonnet 18 compresses the packing 60 in sealing relation between the stem 46 and the upper end of the bonnet 18, while allowing rotation therebetween as will be understood.

The stem 46 is preferably made of corrosion-resistant material such as stainless steel, so that working in co-operation with the corrosion-resistant bonnet a very corrosion-resistant and maintenance free valve assembly is provided.

It will be recognized that in the valve assembly of the invention even when the valve is employed to control the flow of relatively high pressure fluids, for example up to 10,000 pounds per square inch or more, any fluid pressure forces applied to the bonnet 18 do not act in a direction to blow the bonnet out laterally from the valve body. Moreover, in the valve of the invention, any torque applied to the hand wheel 52 in the operation of the valve does not act to unscrew the bonnet from the valve body. In the valve of the invention round bar stock can be employed which provides the maximum of strength with a minimum of size and weight, and without any special cross-sectional shape being required. The valve adapts itself to panel mounting, in the manner described, without necessitating an extra long bonnet and stem. When the valve of the invention is constructed in the preferred manner described so as to have a corrosion-resistant valve seat and stem and a carbon steel body, not only is the corrosion resistance of the seat and stem excellent, but the welding of ordinary carbon steel pipes to the valve body is facilitated to thereby eliminate the possibility of leakage even in very high pressure installations.

While a certain representative embodiment and details have been shown for the purpose of illustrating the invention, it will be apparent to those skilled in this art that various changes and modifications may be made therein without departing from the spirit or scope of the invention.

What is claimed is:

The combination in a globe type valve of a round bar stock body of carbon steel having a round axial bore therethrough of approximately ½ the diameter of the body which is internally threaded at its ends, said body also having a round transverse bore therethrough whose axis intersects the axis of the first bore, and having a diameter slightly greater than the diameter of the first bore, a round corrosion-resistant bar stock bonnet having an externally threaded upper portion and a reduced diameter lower portion, the lower portion extending snugly into the transverse bore in the body to substantially fully close the same, means brazing the bonnet to the body in sealed relation, said bonnet having a round axial bore of about ⅓ the diameter of said bonnet from the top down to a point near the longitudinal axis of the body, a valve seat formed integral to the bonnet and located adjacent the lower end of the axial bore in the bonnet, the bonnet being formed with one passage of a diameter about equal to said bore in said bonnet connecting the underside of the valve seat with the axial bore of the body to one side of the bonnet, and with a second passage of a diameter about equal to said bore in said bonnet connecting the upper side of the valve seat with the axial bore of the body to the other side of the bonnet, a corrosion-resistant stem extending into the bore of the bonnet and having an integral tapered lower end adapted to engage in sealing relation with the valve seat, a hand wheel secured to the upper end of the stem, a portion of the bore of the bonnet and a portion of the stem being cooperatively threaded, an internally threaded packing nut threaded on the upper end of the bonnet, and packing means between the stem and the bonnet compressed by the packing nut.

References Cited in the file of this patent

UNITED STATES PATENTS

| | | |
|---|---|---|
| 529,051 | Victor | Nov. 13, 1894 |
| 1,016,306 | Vial | Feb. 6, 1912 |
| 1,654,550 | Muend | Jan. 3, 1928 |
| 1,743,413 | Weatherhead | Jan. 14, 1930 |
| 1,779,740 | Kehl | Oct. 28, 1930 |
| 1,935,329 | Needham | Nov. 14, 1933 |
| 2,209,709 | Weatherhead | July 30, 1940 |
| 2,301,176 | Elliott | Nov. 10, 1942 |
| 2,418,448 | Arbogast | Apr. 8, 1947 |
| 2,514,532 | Allen et al. | July 11, 1950 |

FOREIGN PATENTS

| | | |
|---|---|---|
| 489,602 | Great Britain | July 29, 1938 |